(12) United States Patent
Ming

(10) Patent No.: US 8,442,221 B2
(45) Date of Patent: May 14, 2013

(54) METHOD AND APPARATUS FOR IMAGE ENCRYPTION AND EMBEDDING AND RELATED APPLICATIONS

(75) Inventor: Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 864 days.

(21) Appl. No.: 11/241,025

(22) Filed: Sep. 30, 2005

(65) Prior Publication Data
US 2007/0076868 A1 Apr. 5, 2007

(51) Int. Cl.
*H04L 29/06* (2006.01)

(52) U.S. Cl.
USPC ............................................... 380/54

(58) Field of Classification Search ........... 380/28, 380/54, 201, 243; 726/30; 382/232
See application file for complete search history.

(56) References Cited

U.S. PATENT DOCUMENTS

| | | | |
|---|---|---|---|
| 3,798,359 A | 3/1974 | Feistel | |
| 4,459,611 A * | 7/1984 | Arai et al. | 380/243 |
| 5,208,857 A | 5/1993 | Lebrat | |
| 5,321,748 A | 6/1994 | Zeidler et al. | |
| 5,535,275 A * | 7/1996 | Sugisaki et al. | 380/203 |
| 5,583,941 A | 12/1996 | Yoshida et al. | |
| 5,659,726 A | 8/1997 | Sandford, II et al. | |
| 5,815,572 A | 9/1998 | Hobbs | |
| 5,970,140 A | 10/1999 | Sandford, II et al. | |
| 6,023,511 A | 2/2000 | Chen et al. | |
| 6,064,738 A * | 5/2000 | Fridrich | 380/28 |
| 6,115,485 A | 9/2000 | Dumoulin et al. | |
| 6,128,411 A * | 10/2000 | Knox | 382/232 |
| 6,400,827 B1 | 6/2002 | Rhoads | |
| 6,430,302 B2 | 8/2002 | Rhoads | |
| 6,505,299 B1 | 1/2003 | Zeng et al. | |
| 6,535,687 B1 | 3/2003 | Tinker et al. | |
| 6,539,475 B1 | 3/2003 | Cox et al. | |
| 6,542,620 B1 | 4/2003 | Rhoads | |
| 6,839,844 B1 | 1/2005 | Okano | |

(Continued)

FOREIGN PATENT DOCUMENTS

| | | |
|---|---|---|
| JP | 02-214264 | 8/1990 |
| JP | 03-085872 | 4/1991 |

OTHER PUBLICATIONS

W. Zeng and S. Lei, Efficient Frequency Domain Selective Scrambling of Digital Video, IEEE Trans. Multimedia, vol. 5, No. 1, 118-128, Mar. 2003.

(Continued)

*Primary Examiner* — William Goodchild
(74) *Attorney, Agent, or Firm* — Chen Yoshimura LLP

(57) ABSTRACT

An image encryption method is described for encrypting an images using an encryption key. The encryption method includes dividing the image into pixel groups and shifting the location of the pixel groups according to an encryption key, and reordering the bits of the pixel values of the image according to an encryption key. Each shifting and reordering is done according to a shifting patterns that is defined by a shifting rule and the bit values of a bit sequence generated from the encryption key. The encrypted image is embedded in a cover image using less significant bits of the cover image for transmission or storage. Corresponding decryption method is also provided. Also described are various applications of image encryption methods in secure handling of digital images, including secure scanning, secure printing, secure ID scanning, secure check reading, remote picture ID verification, and remote document submitting and receiving systems.

16 Claims, 16 Drawing Sheets

U.S. PATENT DOCUMENTS

| | | | |
|---|---|---|---|
| 6,912,658 B1 | 6/2005 | Glogau et al. | |
| 2003/0133620 A1* | 7/2003 | Zlotnick | 382/251 |
| 2004/0202326 A1* | 10/2004 | Chen et al. | 380/263 |
| 2004/0252834 A1* | 12/2004 | Nishimura et al. | 380/201 |
| 2006/0080743 A1* | 4/2006 | Zhu et al. | 726/30 |

OTHER PUBLICATIONS

K. Chung and L. Chang, Large Encrypting Binary Images With Higher Security, Pattern Recognition Letters 19 (1998) 461-468.

H. Chang and J. Liu, A Linear Quadtree Compression Scheme for Image Encryption, Signal Processing: Image Communication 10 (1997) 279-290.

O. Watanabe, A. Nakazaki and H. Kiya, A Fast Image-Scramble Method Using Public-Key Encryption Allowing Backward Compatibility with JPEG2000, 2004 Int'l Conf. on Image Proc. (ICIP) 3435-2438, 2004.

B. Macq and J. Quisquarter, Digital Images Multisolution Encryption, http://www.cni.org/docs/ima.ip-workshop/macq.quisquarter.html, printed from the Internet Sep. 28, 2005.

M. Podesser, H. Schmidt and A. Uhl, Selective Bitplane Encryption for Secure Transmission of Image Data in Mobile Environments, 5th Nordic Signal Processing Symposium, Oct. 4-7, 2002, http://www.norsig.no/norsig2002/Proceedings/papers/cr1037.pdf.

S. Li, C. Li, G. Chen, D. Zhang and N. Bourbakis, A General Cryptanalysis of Permutation-Only Multimedia Encryption Algorithms, http://eprint.iacr.org/2004/374.pdf and http://eprint.iacr.org/2004/374, Dec. 29, 2004.

* cited by examiner

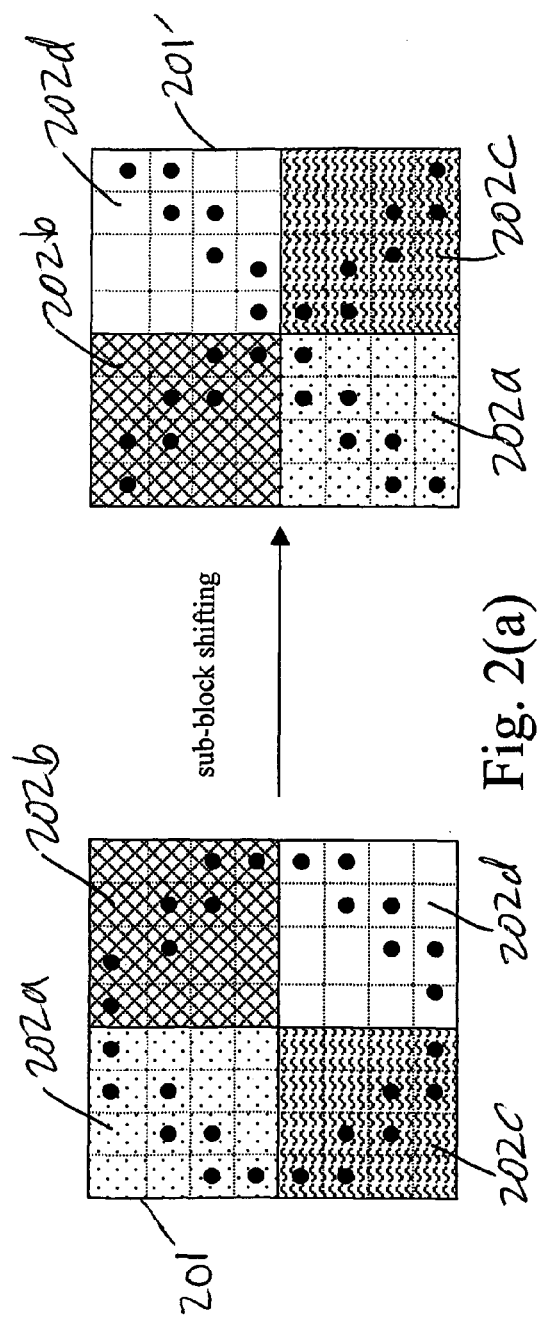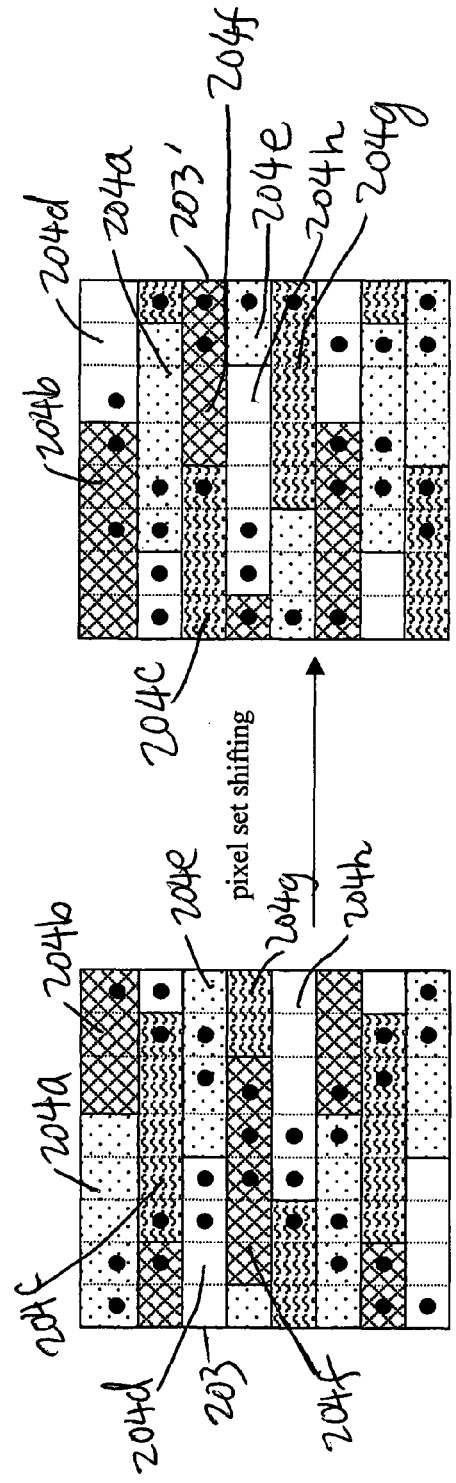
Fig. 2(a)
Fig. 2(c)

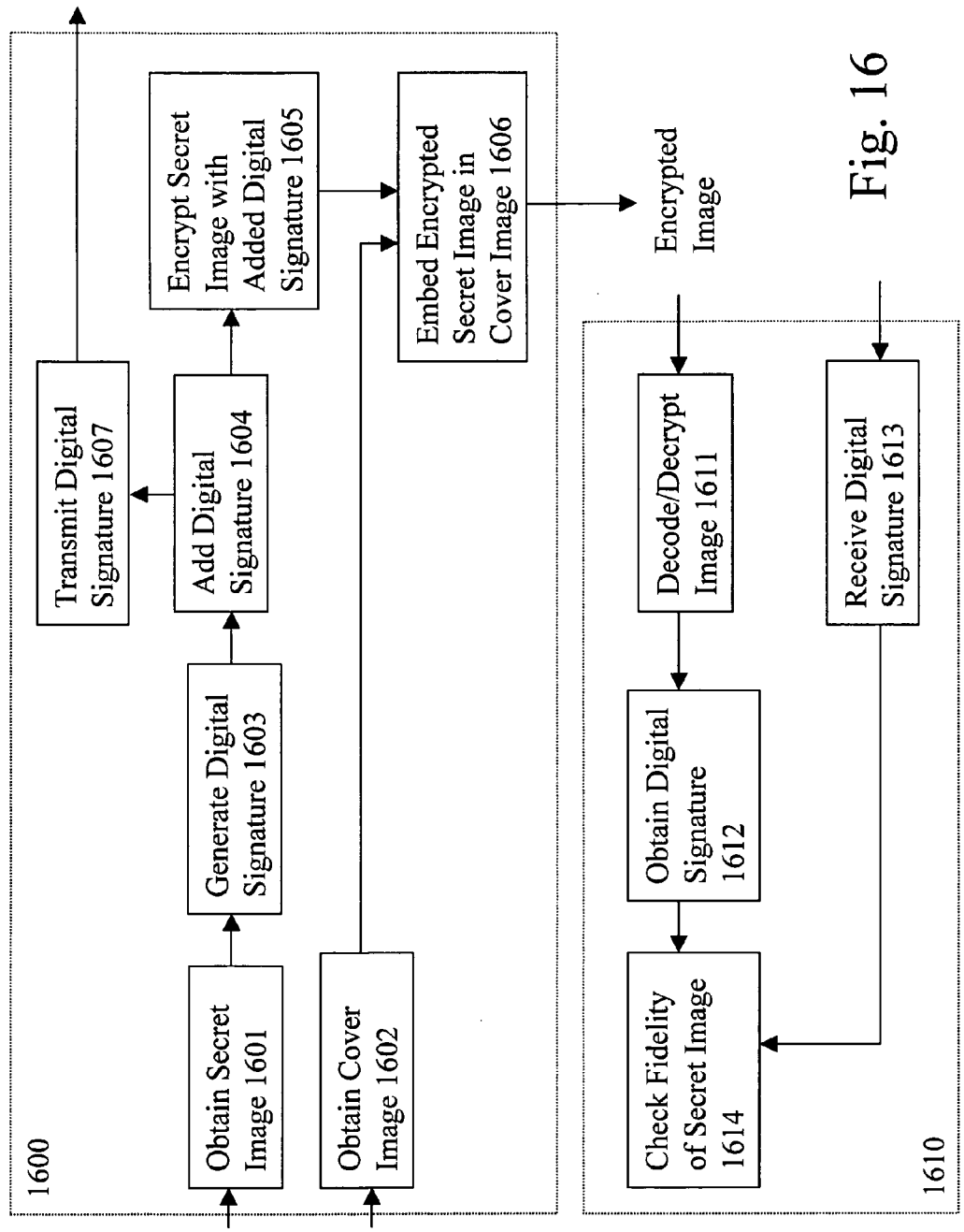

METHOD AND APPARATUS FOR IMAGE ENCRYPTION AND EMBEDDING AND RELATED APPLICATIONS

BACKGROUND OF THE INVENTION

1. Field of the Invention

This invention relates to image encryption, and in particular, it relates to a method and apparatus for encrypting an image using an encryption key and embedding the encrypted image in a cover image. It also relates to methods and apparatuses of applying image encryption in scanning, printing, and electronic transmission of images.

2. Description of the Related Art

Scrambling of image signals has been used in video transmission and distribution as well as other areas to prevent unauthorized use. Scrambling generally refers to shifting the locations of lines and/or blocks on an image (e.g. video screen) so that the image is not easily recognizable. For example, in U.S. Pat. No. 6,535,687, "Method and system for deterring electronic video piracy through image rearrangement", blocks of 3×3 pixels are rearranged using a pseudo random number sequence of numbers 1 to 9. The encryption method is implemented in a projector. U.S. Pat. No. 5,815,572, "Video scrambling", teaches scrambling video data using a combination of line reversal, line permutation, line inversion, and block permutation. The permutation tables and other information needed for unscrambling are stored in the receiver. In U.S. Pat. No. 5,583,941, "Imaging processor", pixel blocks are divided into 2×2 sub-blocks which are transposed diagonally to achieve scrambling. Different levels of scrambling are performed using different block sizes. The scrambling process is implemented in a printer. In U.S. Pat. No. 5,535,275, "Apparatus and method for producing scrambled digital video signals", the screen is divided into 5×10 "super-blocks" each made up of 27 macroblocks, each macroblock consisting of 6 DCT blocks Y1 Y2 CR Y3 Y4 CB. A DCT block is an 8×8 pixel area. The macroblocks are read out in a shuffled sequence, where super-blocks form five columns labeled "A B F D E" and are read out one row at a time in the column sequence of "F B D A E" (see FIG. 13 and cols. 8-9). This patent also teaches further scrambling by exchanging the data order of the Y, CR and CB components (see FIGS. 1-4 and cols. 9-10), as well as bit manipulation of the DCT coefficients (see FIGS. 5-7 and cols. 10-11). U.S. Pat. No. 5,321,748, "Method and apparatus for television signal scrambling using block shuffling", describes video scrambling in which video lines are shuffled within a block of lines. One pseudo random number sequence (e.g. a sequence of numbers 1 to 8) is used for each block of lines and the seed numbers for the pseudo random number sequences are inserted into the video date stream. U.S. Pat. No. 5,208,85, "Method and device for scrambling-unscrambling digital image data", describes scrambling of digital image where each block of N×N pixels is divided into 4 sub blocks and inter-block and intra-block scrambling are performed. Inter-block scrambling exchanges two sub blocks that are located diagonally. Intra-block scrambling exchange pairs of pixels that are located at mirror image locations with respect to a line.

Other scrambling techniques applies scrambling after the pixels have been transformed (e.g. by discrete cosine transform), such as the method described in U.S. Pat. No. 6,505,299, "Digital image scrambling for image coding systems", and the method described in "Efficient Frequency Domain Selective Scrambling of Digital Video", IEEE Trans. Multimedia, Vol. 5, No. 1, 118-128, March 2003.

Embedding data in a carrier data is known. For example, U.S. Pat. No. 6,023,511, "Cryptosystem for encrypting digital image or voice file", describes embedding data representing encrypted image in the low bits of a camouflage image.

SUMMARY OF THE INVENTION

The present invention is directed to image encryption methods and apparatuses that substantially obviate one or more of the problems due to limitations and disadvantages of the related art.

An object of the present invention is to provide an image encryption method that encrypts images using encryption keys.

Another object of the present invention is to provide devices and methods for secure handling of digital images using an image encryption method.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a method for encrypting an input image, the input image comprising a plurality of pixels, each pixel having a pixel value of a plurality of bits, the method including the following steps: (a) dividing the input image into a plurality of pixel groups, each pixel group comprising one or more pixels of the input image; (b) shifting the location of the pixel groups according to an encryption key; and (c) reordering the bits of the pixel values of the input image according to an encryption key, whereby an encrypted image is generated. The method may further include embedding the encrypted image in a cover image, the cover image having a plurality of pixels each having a pixel value of a plurality of bits, the embedding step including replacing less significant bits of the pixel values of the cover image with bits of the pixel values of the encrypted image.

More specifically, step (b) in the above method may include: (b1) generating from the encryption key a bit sequence having a number of bits; (b2) indexing the pixel groups according to the number of bits in the bit sequence; (b3) defining a shifting pattern based on a shifting rule and bit values of the bit sequence; and (b4) shifting the pixel groups according to the shifting pattern. Step (c) in the above method may include: (c1) generating from the encryption key a bit sequence having a number of bits; (c2) indexing the bits of pixel values according to the number of bits in the bit sequence; (c3) defining a shifting pattern based on a shifting rule and bit values of the bit sequence; and (c4) shifting the bits of the pixel values according to the shifting pattern.

In another aspect, the present invention is directed to devices and computer program code capable of performing the above-described methods.

In yet another aspect, the present invention provides various applications of an image encryption method in secure handling of images. One such application is a secure scanning method, which includes: generating a digital image of a document; obtaining an encryption key; encrypting the digital image of the document using the encryption key to generate an encrypted digital image; obtaining a digital cover image; embedding the encrypted image in the cover image; and transmitting the cover image with the encrypted image embedded therein to a receiver. A secure printing method includes: receiving a cover image with an encrypted image embedded therein; obtaining an encryption key; extracting the encrypted image from cover image; decrypting the encrypted image using the encryption key to obtain the digital image of the document; and printing or storing the digital image of the document. The invention is also directed to scanners and printers capable of performing the above described secure scanning and secure printing methods.

It is to be understood that both the foregoing general description and the following detailed description are exemplary and explanatory and are intended to provide further explanation of the invention as claimed.

BRIEF DESCRIPTION OF THE DRAWINGS

FIGS. 2(a)-(b) illustrates an example of the block shifting step of the image encryption method.

FIG. 2(c) illustrates an example of the pixel set shifting step of the image encryption method.

FIG. 16 illustrates a method of checking the fidelity of an encrypted image using a digital signature according to an embodiment of the present invention.

DETAILED DESCRIPTION OF THE PREFERRED EMBODIMENTS

An image encryption method according to embodiments of the present invention is described with reference to FIGS. 1-3. The encryption method is described using a four-digit encryption key "5511" for illustration purposes only, and those skilled in the relevant art will recognize that the method can be used with longer or shorter encryption keys.

Figure 1:
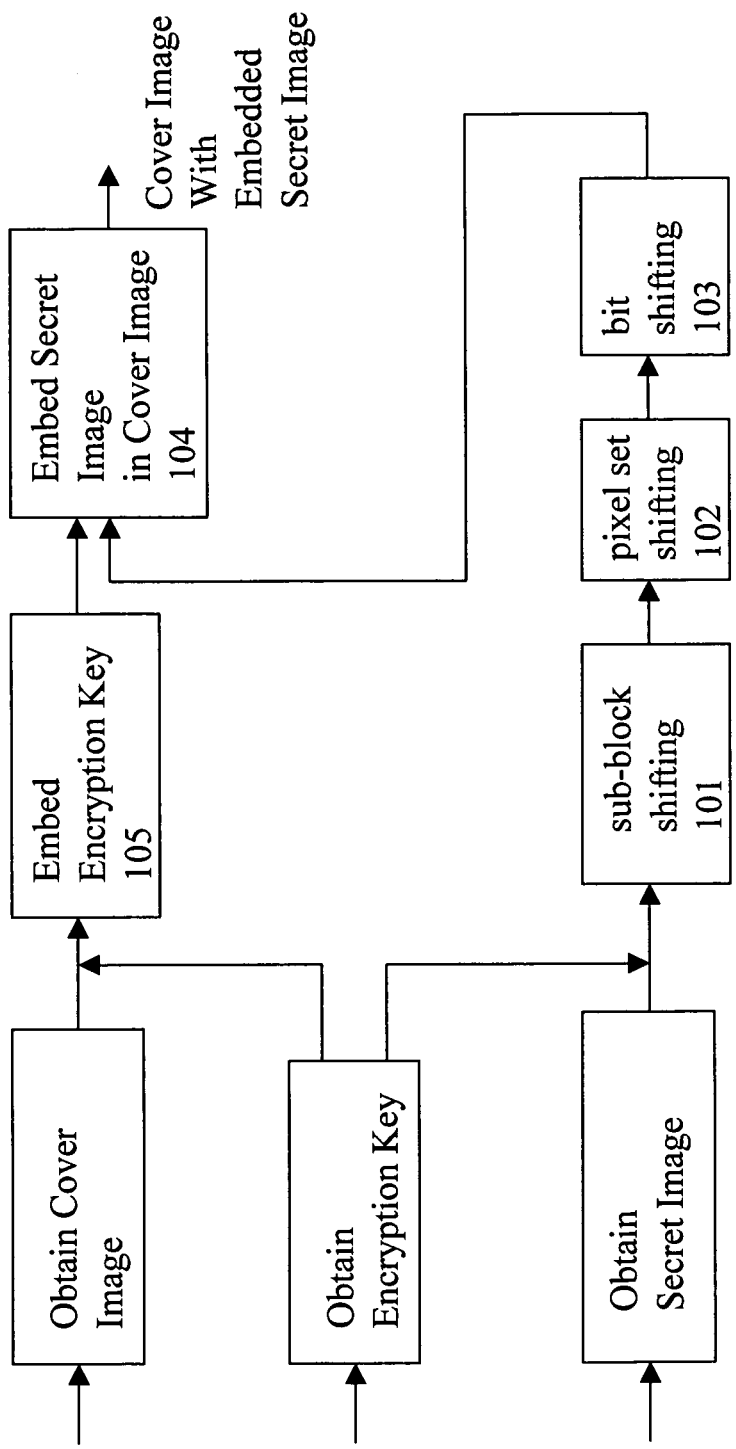
FIG. 1 shows an image encryption and embedding method according to an embodiment of the present invention.

As shown in FIG. 1, the image encryption method includes a sub-block shifting step 101, a pixel set shifting step 102, and a bit shifting step 103. The original image to be encrypted (the input image) is a bitmap image, either color or gray scale, where each pixel has a pixel value of, for example, 0 to 255 (8 bit pixel value). The sub-block shifting and pixel set shifting steps 101 and 102 shift the pixel locations across the image, and the bit shifting step 103 shifts (reorders) the bits within each pixel value. In the sub-block shifting step 101 (see FIG. 2(a)), the image is divided into a plurality of blocks each having N×M pixels. Note that when the image is said to be divided into a plurality of blocks, it is understood that an integer number of blocks may not completely cover the image. For example, the row dimension of the image may not be divisible by N. Thus, it should be understood that an image may be divided into a plurality of blocks with a number of rows or columns at the edge that are not a part of any blocks. These extra rows or columns may be treated differently than the rest of the blocks, or they may be omitted, or blank rows or columns may be added to form complete blocks. N and M may be any appropriate values so long as they permit divisions of a block into a requisite number of sub-blocks (see below). Larger N and M numbers will result in pixels being shifted across a larger distance on the image, while smaller N and M numbers will make the shifted image more granular. FIG. 2(a) shows one such block 201 having 8×8 pixels.

In the sub-block shifting step 101, each block is divided into four equal sized sub-blocks. In the example shown in FIG. 2(a), the block 201 is divided into four 4×4 quadrants 202a, 202b, 202c and 202d, but other divisions may be used, including four equal sized vertical strips or four equal sized horizontal-strips. The positions of the four sub-blocks are shifted in a manner according to one or more digits of the encryption key. The first digit ("5") is used in the illustrated example. The digit(s) is expressed as a binary number (a bit sequence), here $(0101)_2$, and the bits of the bit sequence are shifted by sequentially moving all of the "1" bits to higher (more significant) positions and all of the "0" bits to lower (less significant) positions as shown in FIG. 2(b). In this example, the bit at position 2 ("1") is shifted to position 1, the bit at position 4 ("1") is shifted to position 2, the bit at position 1 ("0") is shifted to position 3, and the bit at position 3 ("0") is shifted to position 4. The four sub-blocks 202a-202d are indexed as #1 to #4 corresponding to the four bit positions of the bit sequence in FIG. 2(c), and their locations are shifted according to how the bits of the bit sequence are shifted. Thus, sub-block #1 (202a) is shifted to the location of sub-block #3 (202c); sub-block #2 (202b) is shifted to the location of sub-block #1 (202a); sub-block #3 (202c) is shifted to the location of sub-block #4 (202d); and sub-block #4 (202d) is shifted to the location of sub-block #2 (202b). The resulting sub-block shifted block 201' is shown in FIG. 2(a).

The number of sub-blocks in each block depends on the number of digits from the encryption key used for the sub-block shifting. For example, using two digits from the encryption key gives an 8-bit bit sequence, the bits of which are re-arranged according to a similar rule as that shown in FIG. 2(b). This allows the block 201 to be formed by eight sub-blocks which are then shifted among themselves.

Figure 2B:
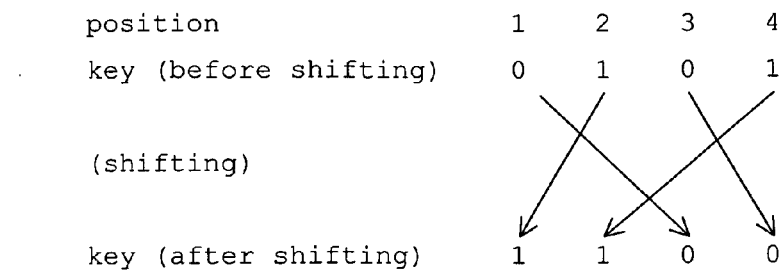

In the pixel set shifting step 102 (see FIG. 2(c)), the image (after processing by the sub-block shifting step 101) is divided into blocks of N'×M' pixels, which may or may not be the same size as the blocks in the sub-block shifting step. FIG. 2(c) shows an 8×8 pixel block 203. Each block is divided into pixel sets as follows. Starting from the upper left hand corner, counting individual pixels from left to right in each row (with wrap-around to the next row) and from the top row to the bottom row, every n pixels is grouped into a pixel set n may be an appropriate fixed value, or a value derived from the encryption key. In the example shown in FIG. 2(c), n is derived by taking the middle four bits of the 8-bit sequence representing the first two digits of the encryption key ("55"). The 8-bit bit sequence is 01010101 and the middle four bits are $(0101)_2$, which is 5. Thus, n=5 and the five-pixel pixel sets are 204a, 204b, 204c, 204d, . . . as shown in FIG. 2(c). Within every four consecutive pixel sets (e.g. 204a-204d in FIG. 2(c)), the positions of the pixel sets are shifted with respect to each other in a manner according to a digit of the encryption key, which is the second digit ("5") in the illustrated example. The shifting method is similar to that used in the sub-block shifting step: First, the digit from the encryption key is expressed as a 4-bit bit sequence, and the digits in the bit sequence are rearranged by moving all of the "1" bits to higher positions and all "0" bits to lower positions in a similar way as shown in FIG. 2(b). Then, the four pixel sets (indexed as #1 to #4) are shifted according to how the bits in the 4-bit bit sequence are shifted. Thus, pixel set 204a is shifted to the position of pixel set 204c; pixel set 204b is shifted to the position of pixel set 204a; pixel set 204c is shifted to the position of pixel set 204d; and pixel set 204d is shifted to the position of pixel set 204b. The next four pixel sets 204e-g are shifted among themselves in a similar manner. The resulting pixel set shifted block 203' is shown in FIG. 2(c).

The number of pixel sets that are shifted among themselves is determined by the number of digits from the encryption key used for the pixel set shifting. For example, using two digits from the encryption key gives an 8-bit bit sequence, which allows eight pixel sets (n pixels per set) to be shifted among themselves.

The bit shifting step 103 shifts (reorders) the bits within each pixel value. In a preferred embodiment, the pixel value is 8 bit, and may represent one of the color components in a color image or the gray scale value in a gray scale image. The bits of the pixel value are shifted according to the last two digits of the encryption key in the illustrated example, as shown in FIG. 3. In this example, the pixel value is 3, or $(00000011)_2$. The last two digits of the encryption key, "11" in this example, are expressed as an 8-bit bit sequence, 4 bits from each digit. The key bit sequence is 00010001 in this example (Row (b) in FIG. 3). Row (a) in FIG. 3 designates the bit positions 1-8 for ease of reference. The bits of the key bit sequence (Row (b)) are shifted by moving all of the "1" bits to higher (more significant) positions and all "0" bits to lower (less significant) positions, and shown in Rows (b)-(d) of FIG. 3. The binary pixel value is bit-reversed, i.e., the least significant bit becomes the most significant bit, the second least significant bit becomes the second most significant bit, etc. Then the bits of the bit-reversed pixel value are shifted in the same way the bits in the key bit sequence (Row (b)) are shifted, as illustrated in Rows (e)-(g) of FIG. 3. Row (g) is the output pixel value after bit shifting, here having a value of 0x30.

Computationally, the above bit shifting of the pixel value may be accomplished as follows. Let the bit sequence of the pixel value be $(p_7 p_6 p_5 p_4 p_3 p_2 p_1 p_0)$ and let the bit sequence derived from the key be $(k_7 k_6 k_5 k_4 k_3 k_2 k_1 k_0)$. Form two 16-bit bit sequences:
Then, the bits in the p-sequence that correspond in position to all "1" bits in the k-sequence are taken in that order and form the 8-bit value which is the output pixel value. Note that similar computation method can be applied to the shifting illustrated in FIG. 2(b) as well.

The key bit sequence in the above bit-shifting example has 8 bits, which correspond to the 8-bit pixel values. Alternatively, longer or shorter key bit sequences may be used. For example, if a 4-bit sequence is used, then the 8 bits in a pixel value may be divided into two 4-bit groups and shifted. If a 16-bit sequence is used, then two 8-bit pixel values may be combined into 16 bits and shifted.

Figure 3:
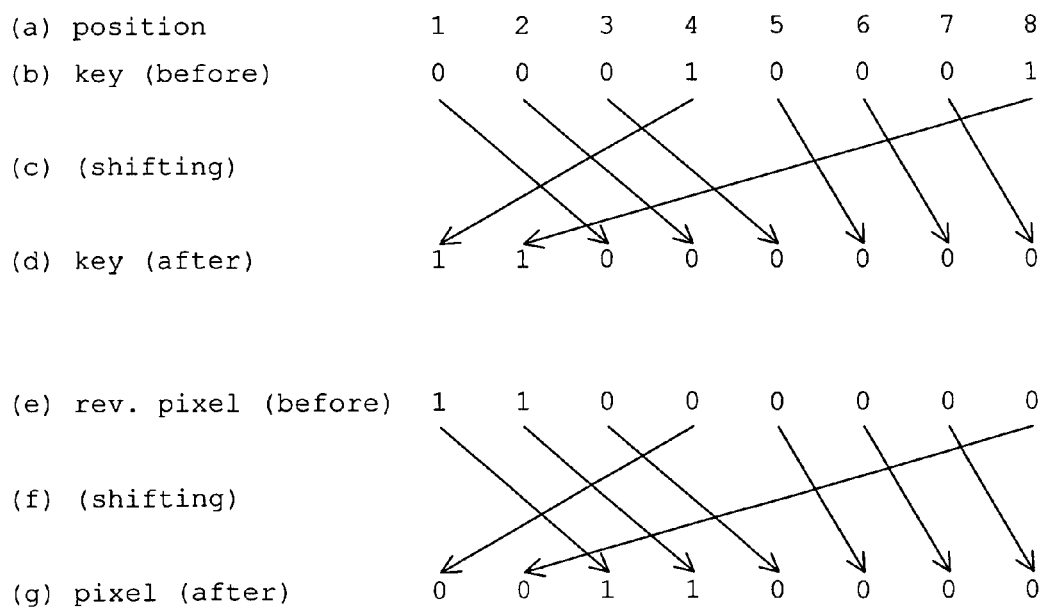
FIG. 3 illustrates an example of the bit shifting step of the image encryption method.

Although FIGS. 2(b) and 3 illustrate particular rules by which the bits in the bit sequence of the key are shifted, other shifting rules may be used. For example, all of the "0" bits may be shifted to higher order positions, or additional shifting may be done, etc. The shifting pattern (i.e. which bit is shifted to which position) depends on the shifting rule and the bit values of the original bit sequence. It should be understood that while FIGS. 2(b) and 3 illustrate shifting of the bits of the key bit sequence, the key bit sequence may not actually be shifted in the computation; these figures merely illustrate how a shifting pattern may be defined by the shifting rule and the bit values of the key bit sequence. A variety of computational methods may be used to implement the shifting.

Figure 4:
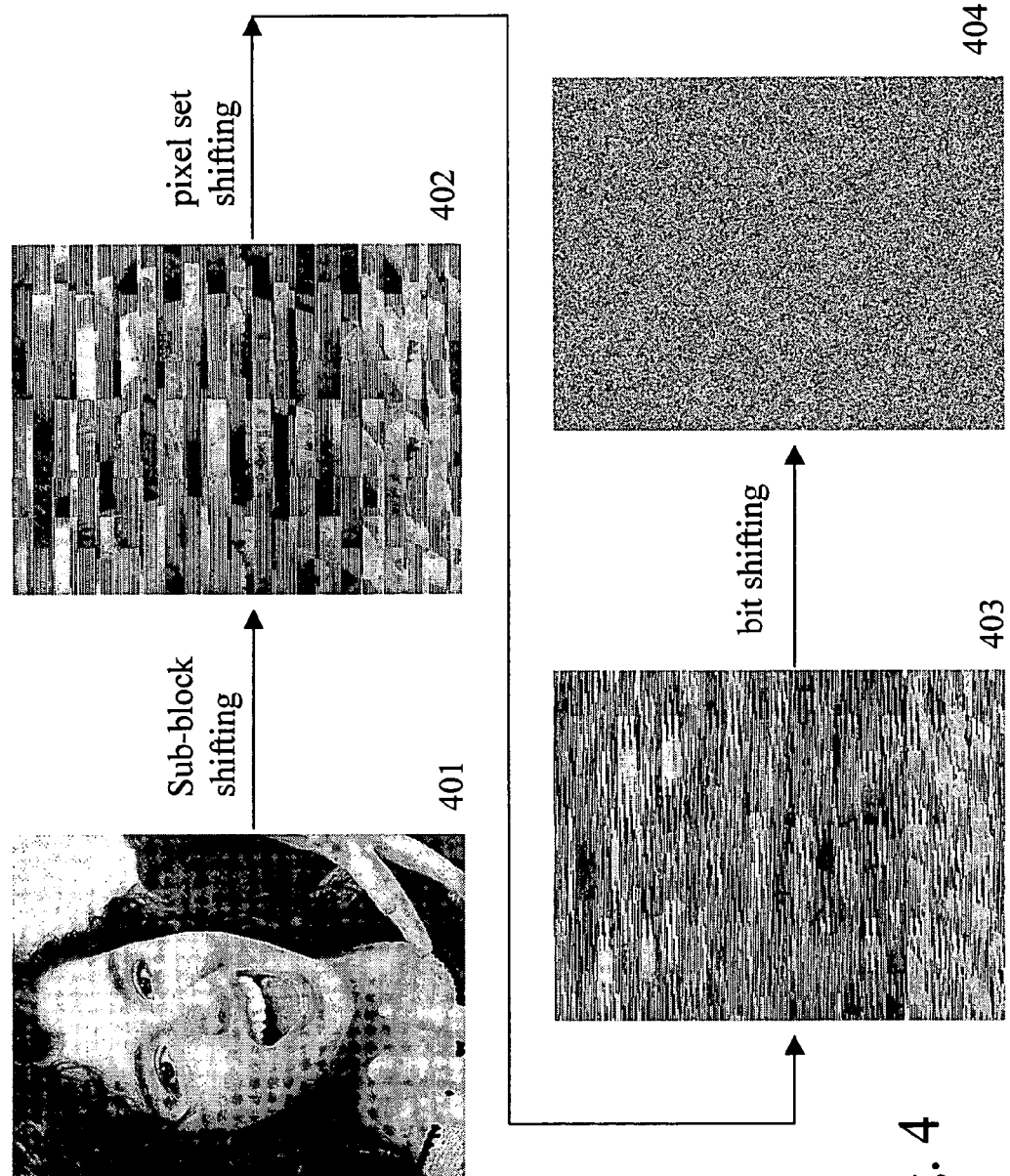
FIG. 4 show an image after various stages of the image encryption process.

FIG. 4 shows an original image 401, an image 402 after sub-block shifting, an image 403 after pixel set shifting 403, and an image 404 after bit shifting of pixel values (i.e. the encrypted image). It can be seen that sub-block shifting achieves a certain level of image scrambling, and pixel set shifting achieves a higher level of image scrambling, while the scrambled image may still have some structure. The final bit shifting step results in a bitmap image that looks like white noise. The images shown in FIG. 4 were processed with an encryption key "123456". The first two digits ("12") were used to perform sub-block shifting; the next two digits ("34") were used to perform pixel set shifting; and the last two digits ("56") were used to perform bit shifting of the pixel values. In the sub-block shifting step, the image (1150×1450 pixels) was divided into sub-blocks of 115×50 pixels each (thus 10×29 sub-blocks in total), and every eight consecutive sub-blocks in the same row (with wrap-around to the next row) formed a block. Within each block, the eight sub-blocks were shifted using the key "12". In the pixel-set shifting step, the entire image was treated as a block. Each pixel set consisted of 50×1 pixels, and every eight consecutive pixel sets were shifted among themselves using the key "34".

It can be seen that the sub-block shifting step 101 and pixel set shifting step 102 are similar in that they both involve shifting the locations of pixel groups within the image according to an encryption key. The pixel groups are the sub-blocks in the sub-block shifting step and the pixel sets in the pixel set shifting step. Both steps may be described as a spatial shifting process in which the shifting of the pixel group is determined by an encryption key. Note that the term "shifting" does not imply that the pixel groups maintain their shape after shifting. In the pixel set shifting step 102, for example, the shape of the pixel set 204b is changed after the shifting it is shifted to a different location. Also, the term "group" does not imply contiguous pixels within the pixel groups, as similarly demonstrated in the pixel set shifting step 102.

Described broadly, an encryption method according to embodiments of the present invention takes a bitmap image and generates a bitmap image of the same size that looks like white noise. The method includes one or more spatial shifting steps and a bit shifting step. Spatial shifting involves dividing the image into a plurality of pixel groups, and shifting the locations of the pixel groups according to an encryption key. Spatial shifting may be performed a number of times, and different pixel group definition and shifting pattern may be used each time. Bit shifting shifts (reorders) the bits of each pixel value according to an encryption key. Bit shifting may be performed before, after, or concurrently with spatial shifting (e.g., performing spatial shifting and bit shifting for one area of the image, and then another area of the image). In this regard, the method claims should be understood to require no particular order of the method steps unless an order is expressly recited. For example, when a method step is said to be performed on the input image, it does not imply that that step must be performed as the first step in the claimed method.

The encrypted image 404 can now be embedded in a cover image (carrier image) to be transmitted (see FIG. 1, step 104). Embedding can be done in a variety of ways. For example, each 8-bit pixel value in the encrypted image may be broken into four 2-bit sequences, and each 2-bit sequence may be embedded in the two lowest (least significant) bits of the pixel values of the cover image. In other words, the two lowest bits of the pixel values of the cover image are replaced by two bits of the encrypted image. Note that such embedding requires the cover image to be at least four times the size (in terms of the number of pixels) of the encrypted image. Alternatively, each pixel in the encrypted image may be broken into two 4-bit sequences and embedded in the lower four bits of the pixel values of the cover image. This requires a cover image of at least two times the size of the encrypted image, but the resulting cover image with the encrypted image embedded therein may have poor quality. Alternatively, in a lossy embedding method, the six more significant bits of each pixel of the encrypted image may be broken into three 2-bit sequence and embedded in the lower two bits of three of every four pixels of the cover image. Other variations are also possible.

Figure 5:
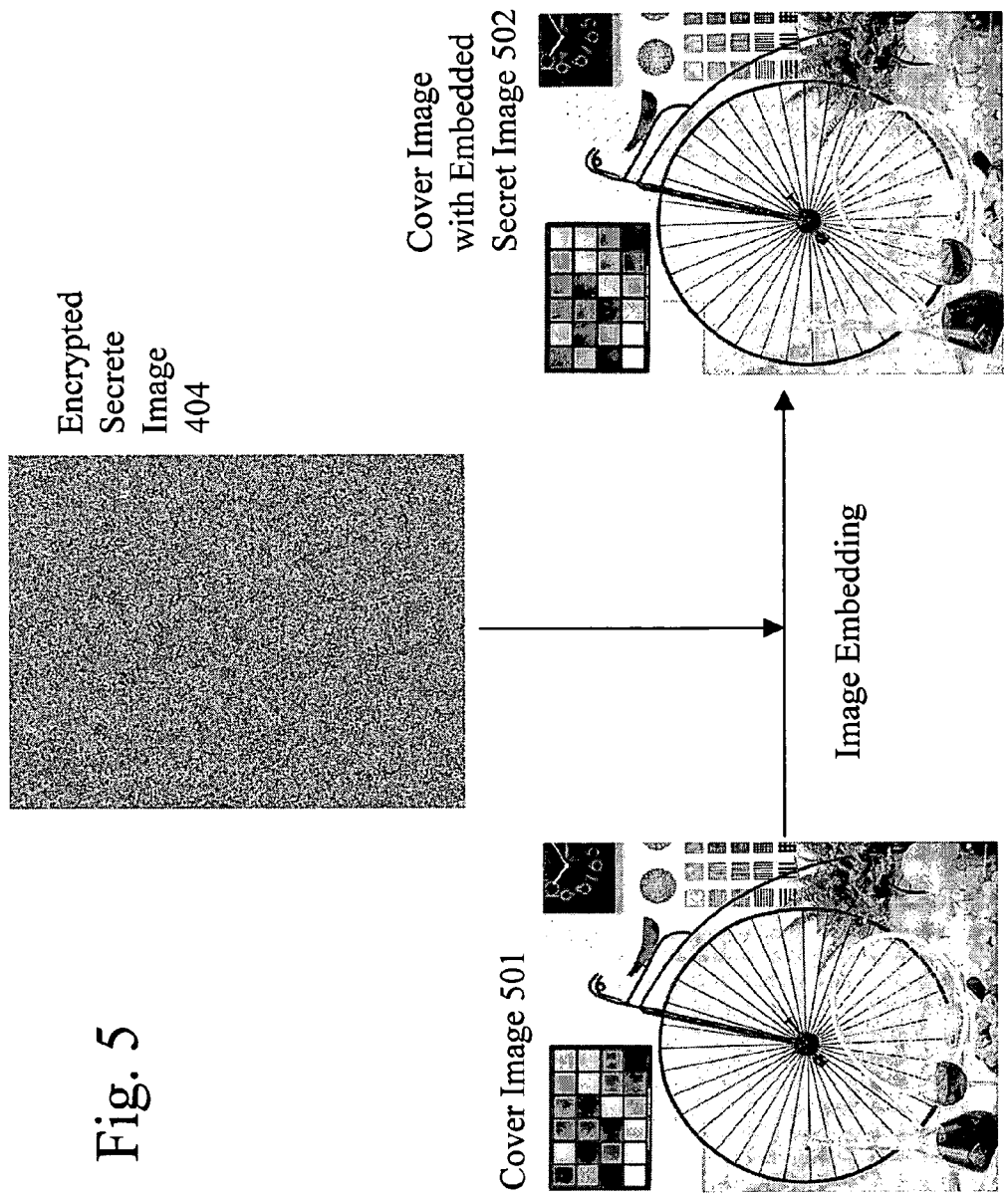
FIG. 5 show a cover image before and after an encrypted image is embedded.

FIG. 5 shows an original cover image 501 and a cover image 502 after the encrypted image 404 is embedded in the lower 2 bits of the cover image.

Figure 6:
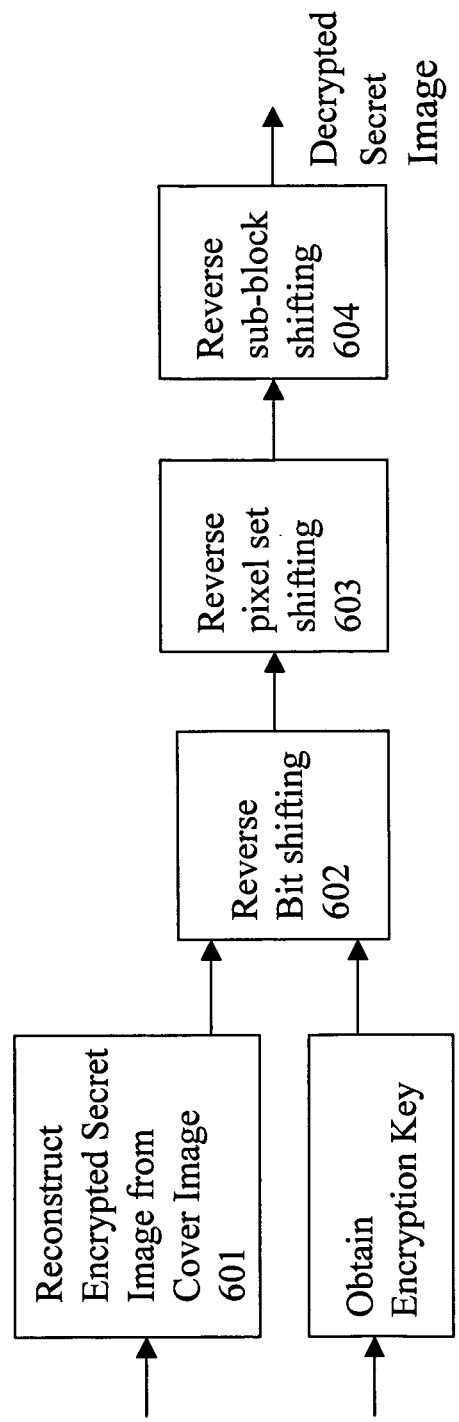
FIG. 6 shows an image decoding and decryption method according to an embodiment of the present invention.

The embedded image can be extracted from the cover image and decrypted (decoded) to recover the original image in a process that is the reverse of the encrypting and embedding method, as shown in FIG. 6. In other words, the lower 2 bits of the cover image are extracted and the 8-bit pixel values of the encrypted image are reconstructed (step 601). The bits of the pixel values are reverse-shifted in a manner that is the reverse of the bit shifting in the encryption process (reverse bit shifting step 602). The pixel sets and sub-blocks are then reverse-shifted in a manner that is the reverse of the pixel set and sub-block shifting in the encryption process (reverse pixel set shifting step 603 and reverse sub-block shifting step 604). This gives the original image without any loss of information (unless a lossy embedding method is used). Further detailed description of image recovery method is unnecessary.

The image encryption method described above can be applied to encrypt color and gray scale images.

The encryption keys in the examples given above contain only numbers. Alternatively, they may contain both numbers and letters, which may then be converted to 4-bit, 8-bit, or other suitable bit sequences for use in the encryption. The encryption key may be inputted by a user (such as the user of a scanner or printer in the secure scanning and printing application described later), or it may be supplied by the encryption program without involving the user, such as by using a random number generator. The encryption key may be transmitted to the receiver separately from the encrypted and embedded image. Alternatively, as shown in FIG. 1 (step 105), the encryption key may be embedded in the cover image in a pre-defined manner, such as by embedding it in one or more corners of the cover image. The encryption key may also be conveyed in the cover image using other methods. In one example, a 128-bit encryption key is converted to four sets of CMYK values representing four colors, and the four colors are added to the cover image as color patches. Alternatively, other decorative elements that encode the key may be added in the cover image.

Image encryption and embedding method has wide applications, some of which are described with reference to FIGS. 7-15.

Secure Scanning and Secure Printing

Figure 7:
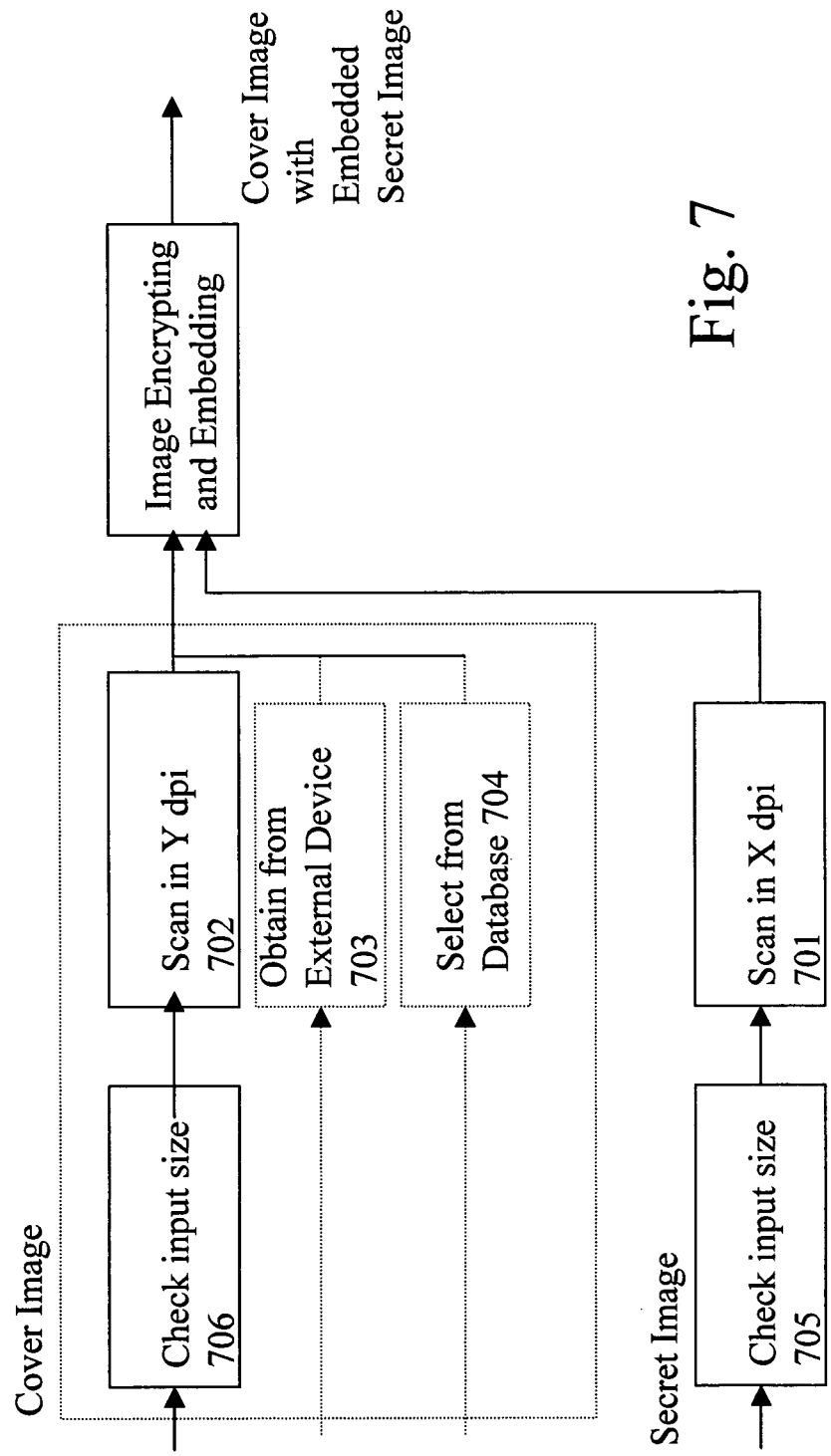
FIG. 7 shows a secure scanning method according to an embodiment of the present invention.

Scanning is a process that generates a digital copy of an input image in print form. In a secure scanning process according to embodiments of the present invention, an input image (the secret image) is scanned into a digital form, encrypted using an image encryption method (optional), and embedded in a cover image. The image encryption method may be the ones described earlier in this disclosure, or any other suitable image encryption method; or the secret image may be embedded in the cover image without having been encrypted. Preferably, the scanner only outputs the cover image with the encrypted image embedded therein for transmission or saving to a memory, and does not output an unencrypted digital form of the secret image or a cover image without the encrypted image embedded therein. As shown in FIG. 7, the secret image is typically scanned in (step 701), while the cover image may be either scanned in (step 702) or obtained as an existing digital image, which may be either pre-stored in the scanner (step 704) or obtained from an external device connected to the scanner (step 703). Typically, the cover image is larger in size (in terms of the number of pixels) than the secret image in order to embed the encrypted image. Thus, if both images are being scanned in and have similar physical sizes, the cover image will be scanned in at a higher resolution. Thus, steps of checking the input image size (steps 705 and 706) may be performed.

Figure 8:
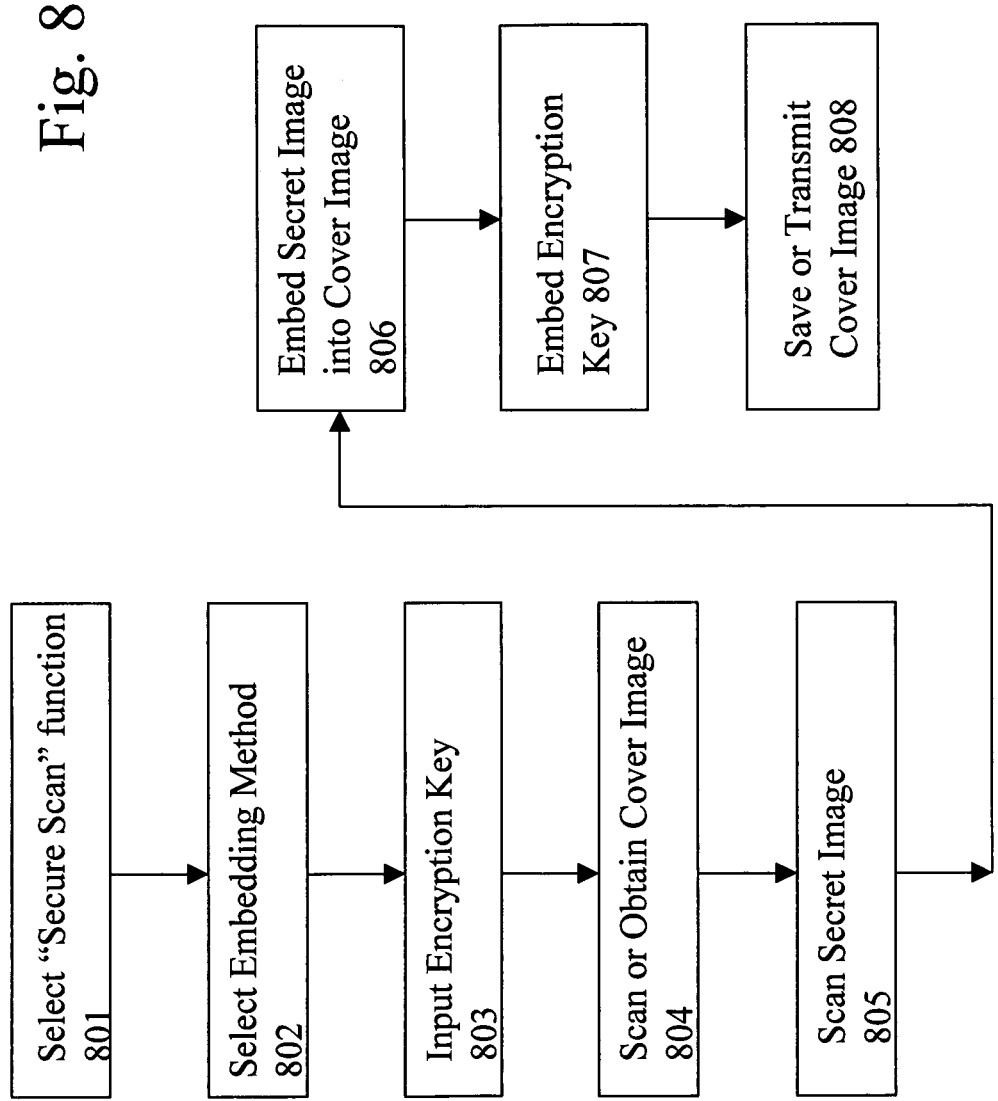
FIG. 8 illustrates the operation of a scanner that implements the secure scanning function.

FIG. 8 illustrates the operation of a scanner that implements the secure scanning function. After selecting the Secure Scan function (step 801), the user selects the embedding method (step 802) (optional; a default embedding method may be used) and input the encryption key (step 803). The cover image is scanned in or obtained as digital data from the scanner memory or an external source (step 804). The secret image is canned in (step 805). The scanner than performs an image encryption (optional) and embedding process (step 806) to embed the secret image into the cover image. The encryption key may also be embedded in the cover image (step 807). The cover image is then transmitted or saved (step 808).

Figure 9:
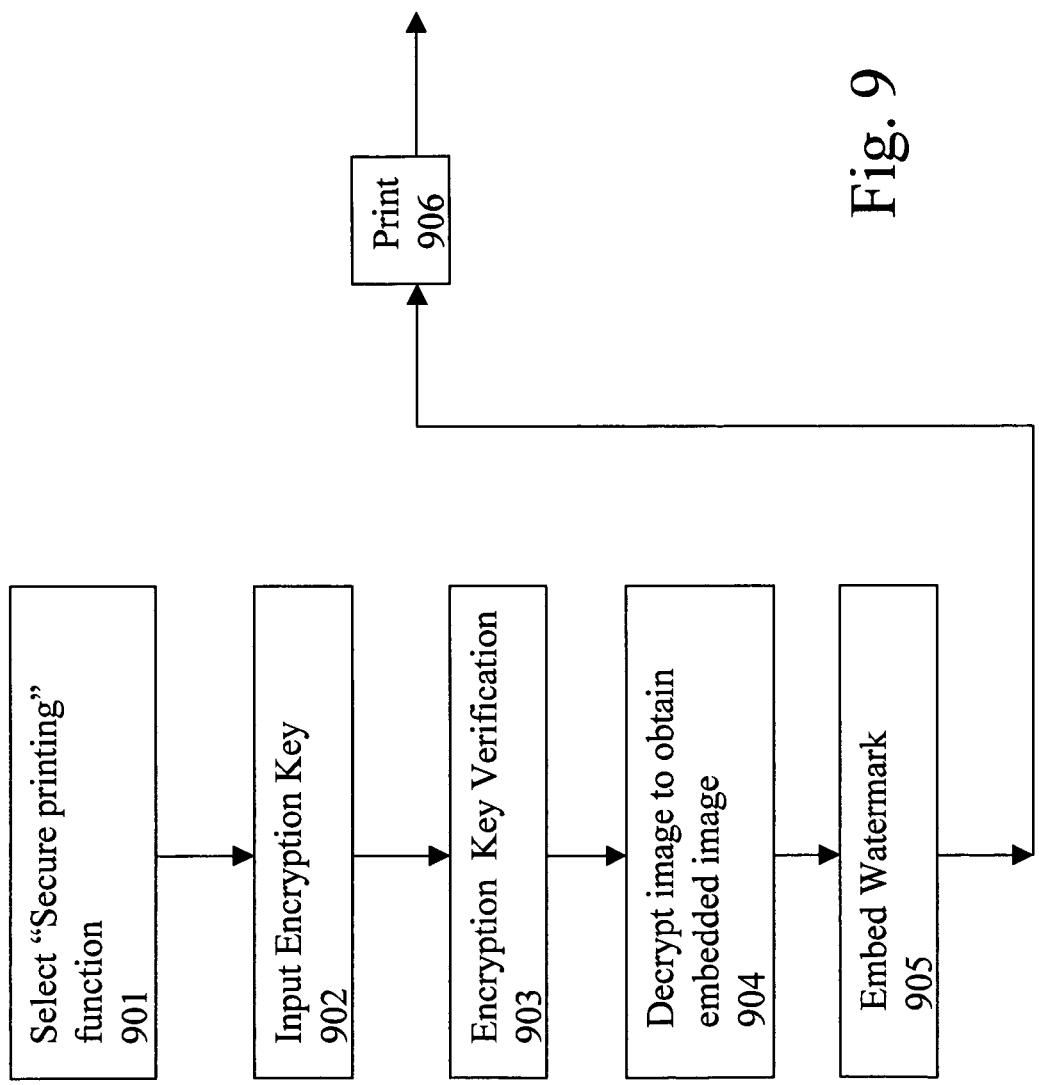
FIG. 9 illustrates the operation of a printer that implements a secure printing function according to an embodiment of the present invention.

A secure printing function decodes and decrypts an input cover image that has an encrypted secret image embedded therein and prints the decrypted secret image. The input cover image may originate from a scanner that implements a secure scanning function, or a computer that implements an image encryption method, etc. Again, the image may have been encrypted with a method described earlier in this disclosure or any other suitable method, or it may be merely embedded but not encrypted, in which case decryption will be unnecessary. Optionally, before printing the decrypted image, the printer may add a visible watermark to the image which is intended to warn against or prevent further distributing. FIG. 9 illustrates the operation of a printer that implements the secure printing function. After selecting the secure printing function (step 901), the user inputs the encryption key (step 902) that has been used to encrypt the image. Optionally, if the encryption key is also embedded in the cover image, the encryption key is verified by comparing the inputted key with the embedded key (step 903). The embedded image is extracted from the cover image and decrypted to obtain the secret image (step 904). Watermark is optionally added (step 905) and the secret image is printed (step 906).

Figure 10:
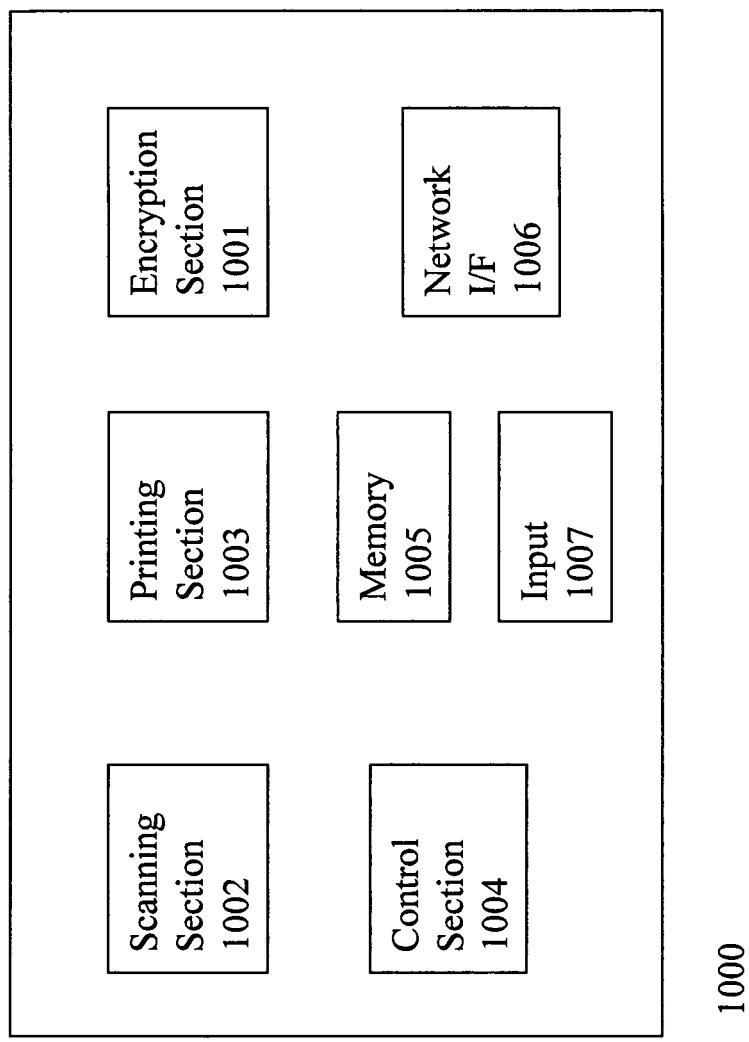
FIG. 10 shows a scanner, a printer, or a copier/printer/scanner "multifunction" device implementing a secure scanning or printing function according to an embodiment of the present invention.

FIG. 10 shows a scanner, a printer, or a copier/printer/scanner "multifunction" device 1000 that includes an image encryption section 1001 that implements image encryption and embedding and/or image recovery. The image encryption section 1001 may be implemented as dedicated hardware logic, dedicated processor, or firmware or software executed by the CPU of the scanner. The other components of the device—scanning section 1002, printing section 1003, control section 1004, memory 1005, network interface 1006, and input section 1007—are conventional. A scanner only or printer only device may only have a subset of these components. The memory 1005 (a computer usable medium) stores software or firmware programs (computer readable code) including programs for encrypting an input image. The memory 1005 or other computer usable medium storing the software or firmware programs constitutes a computer program product.

Secure ID Scanning Device

Figure 11:
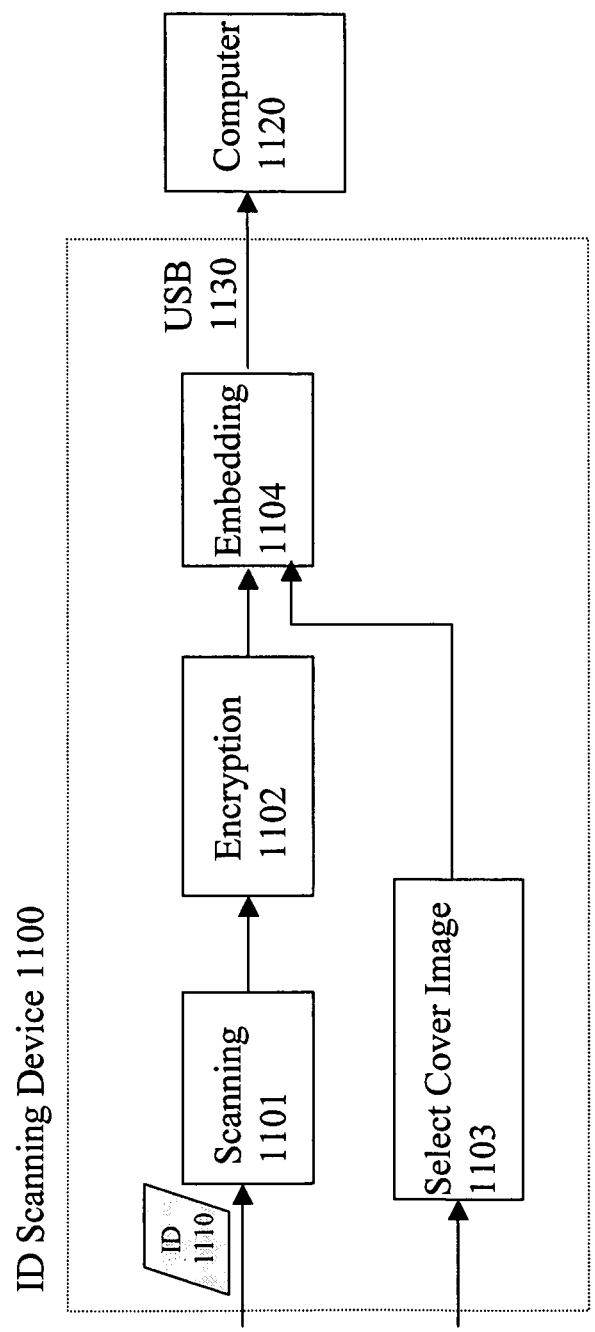
FIG. 11 illustrates a secure ID scanning device according to an embodiment of the present invention.

FIG. 11 illustrates a dedicated scanning device for securely scanning ID cards or similar documents and securely transmitting the scanned images through a network such as the Internet. The secure ID scanning device 1100 has a scanning section 1101 for scanning an ID card or similar document 1110 and generating a digital image, an encryption section 1102 for encrypting the scanned image, a selection section 1103 for obtaining a cover image (which may be selected by a user or by the scanning device from its database, or a default cover image may be used), and an embedding section 1104 for embedding the encrypted image in the cover image. An encryption key may be inputted by the user or supplied by the scanning device. The ID scanning device 1100 may be connected to a computer 1120 via a wired or wireless connection 1130, such as a USB connection. Alternatively (not shown), the ID scanning device may be directly connected to the Internet and transmit the encrypted and embedded images to a destination via the Internet. The ID scanning device 1100 may optionally provide normal (non-secured) scanning of documents. Such ID scanning devices may be installed at businesses or other public places to facilitate secure business transactions.

Secure Check Reader

Figure 12:
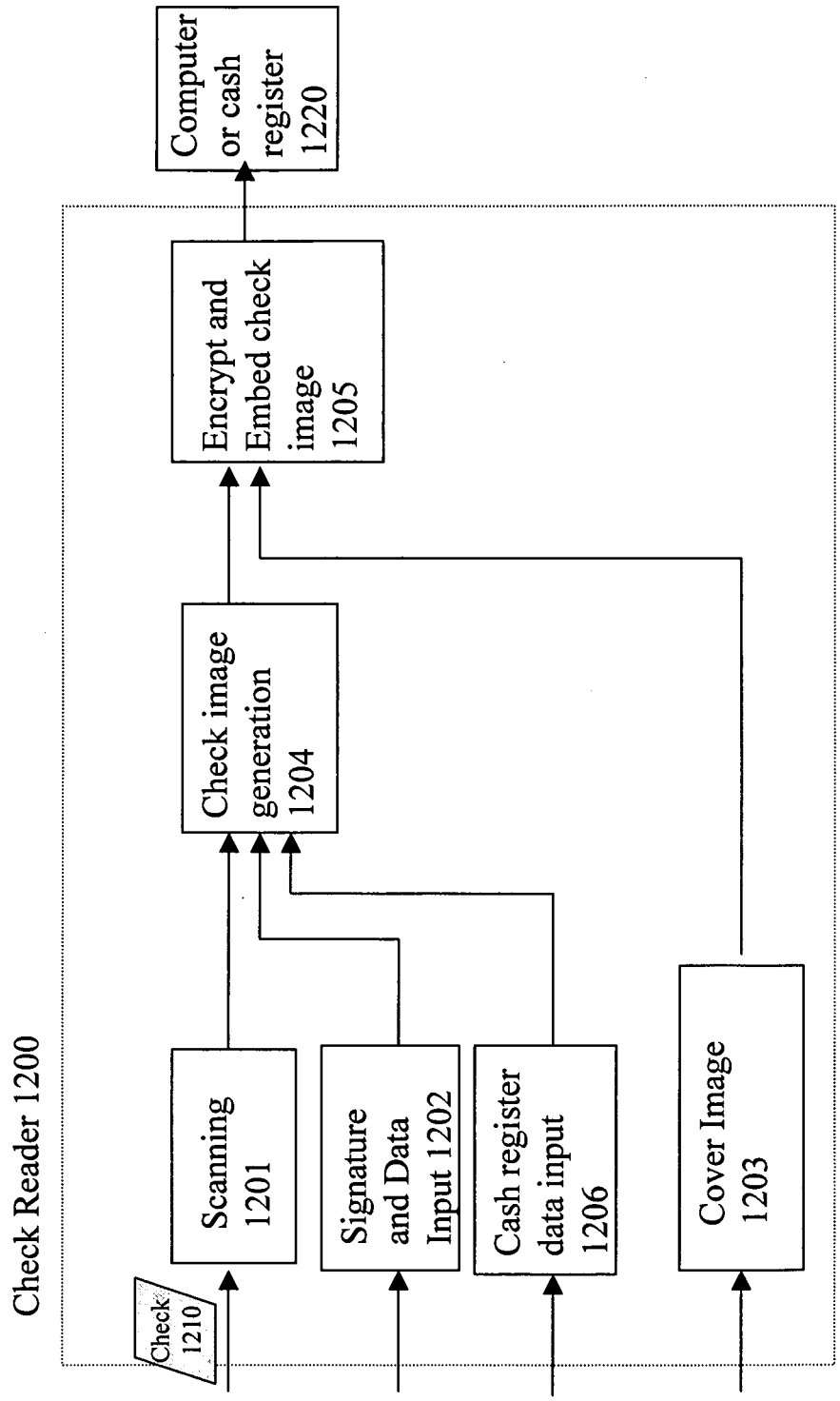
FIG. 12 illustrates a secure check reader according to an embodiment of the present invention.

Although electronic payment methods are pervasive today, personal checks are still being widely used at point-of-sale locations. Shoppers need to carry their checkbooks and shops need to process many checks. A dedicated check reader may be used to facilitate and simplify transactions involving personal checks. As shown in FIG. 12, the check reader 1200 is connected to a cash register or computer 1220 to provide check reading and processing functions. First, a scanning section 1201 scans a user's blank personal check 1210, and a signature and data input section 1202 allows the user to input relevant data and sign his or her name. The input data may include the amount of the payment, the check number, the payee's name, a short message to be included on the check (the "For" line), etc. A cash register data input section 1206 may import certain data automatically from the cash register, such as the amount of the payment, the payee's name, etc. Then a check image generation section 1204 combines the image of the blank check, the relevant input data and the user's signature to generate an image of the check. An encryption and embedding section 1205 encrypts the image of the check and embeds it in a cover image provided by a cover image section 1203. The cover image having the embedded image is then transmitted by the computer or cash register 1220 to the intended bank via the Internet. With such a check reader, a shopper can use the familiar check-writing method for payments, but only needs to carry one blank personal check. Processing of the checks at banks becomes easier because it reduces manual handling of checks and because part of the information associated with the check is already in the digital form.

Remote Picture ID Verification System

Figure 13:
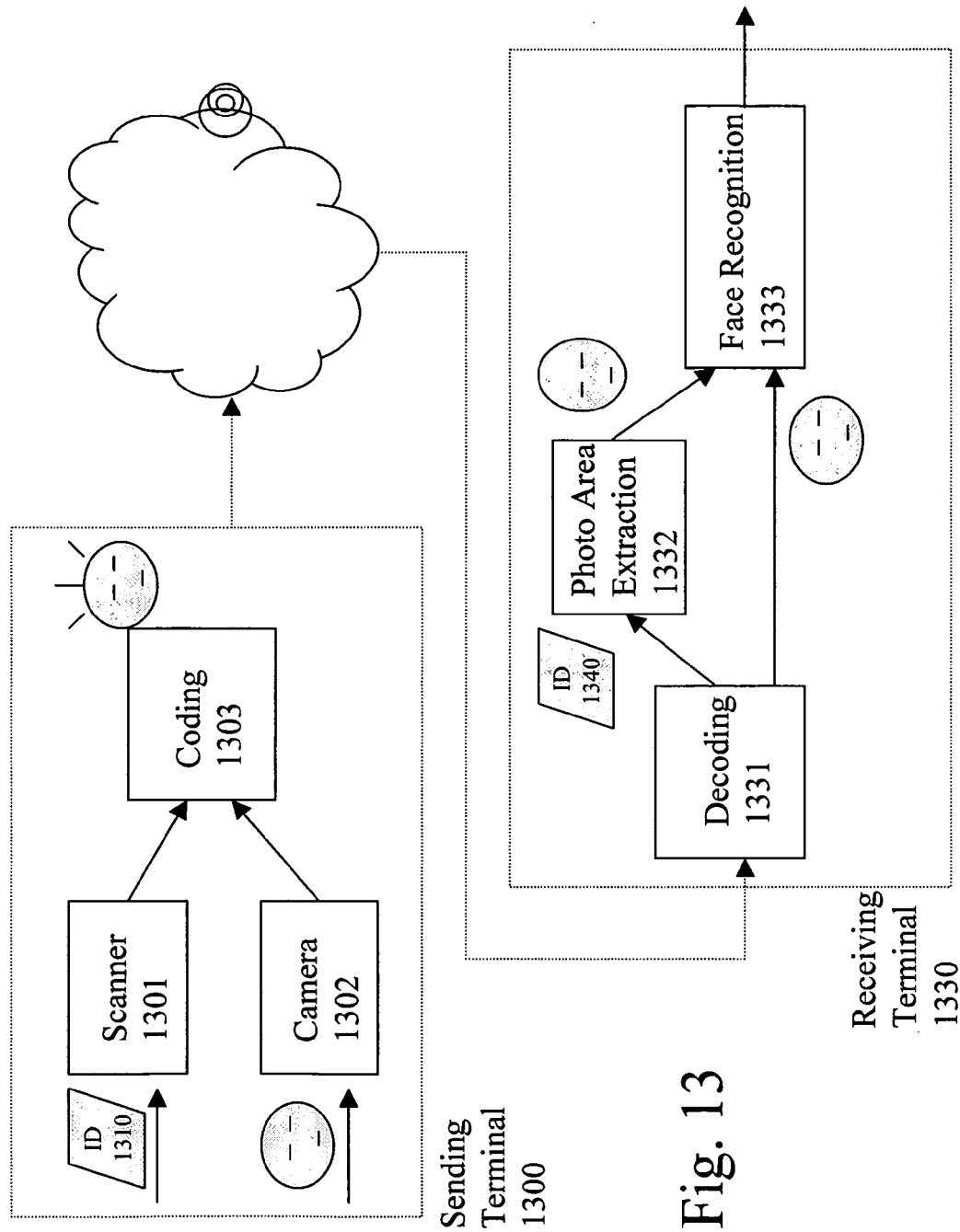
FIG. 13 illustrates a remote picture ID verification system according to an embodiment of the present invention.

FIG. 13 shows a remote picture ID verification system useful for verifying the identity of an ID card holder. At a sending terminal 1300, a scanner 1301 scans a picture ID card presented by the ID card holder. At the same time, a camera 1302 takes a picture of the face of the ID card holder. A coding section 1303 encrypts the scanned ID card image and embeds it into the picture of the ID card holder (the cover picture). The cover picture with the embedded information is transmitted through a network such as the Internet to a remote receiving terminal 1330. A decoding section 1331 of the receiving terminal extracts the embedded image of the ID card 1340 from the cover picture and decrypts it. A human operator may then view the decrypted image of the ID card and compare the picture on the ID card to the picture of the card holder (the cover picture) to verify the identify of the card holder. Alternatively (as shown in FIG. 13), a photo area extraction section 1332 extracts the picture on the ID card and a face recognition section 1333 of the receiving terminal automatically compares the cover picture with the picture extracted from the ID. The face recognition section 1333 may be implemented by appropriate pattern recognition algorithms.

Remote Document Submitting and Receiving System.

Figure 14:
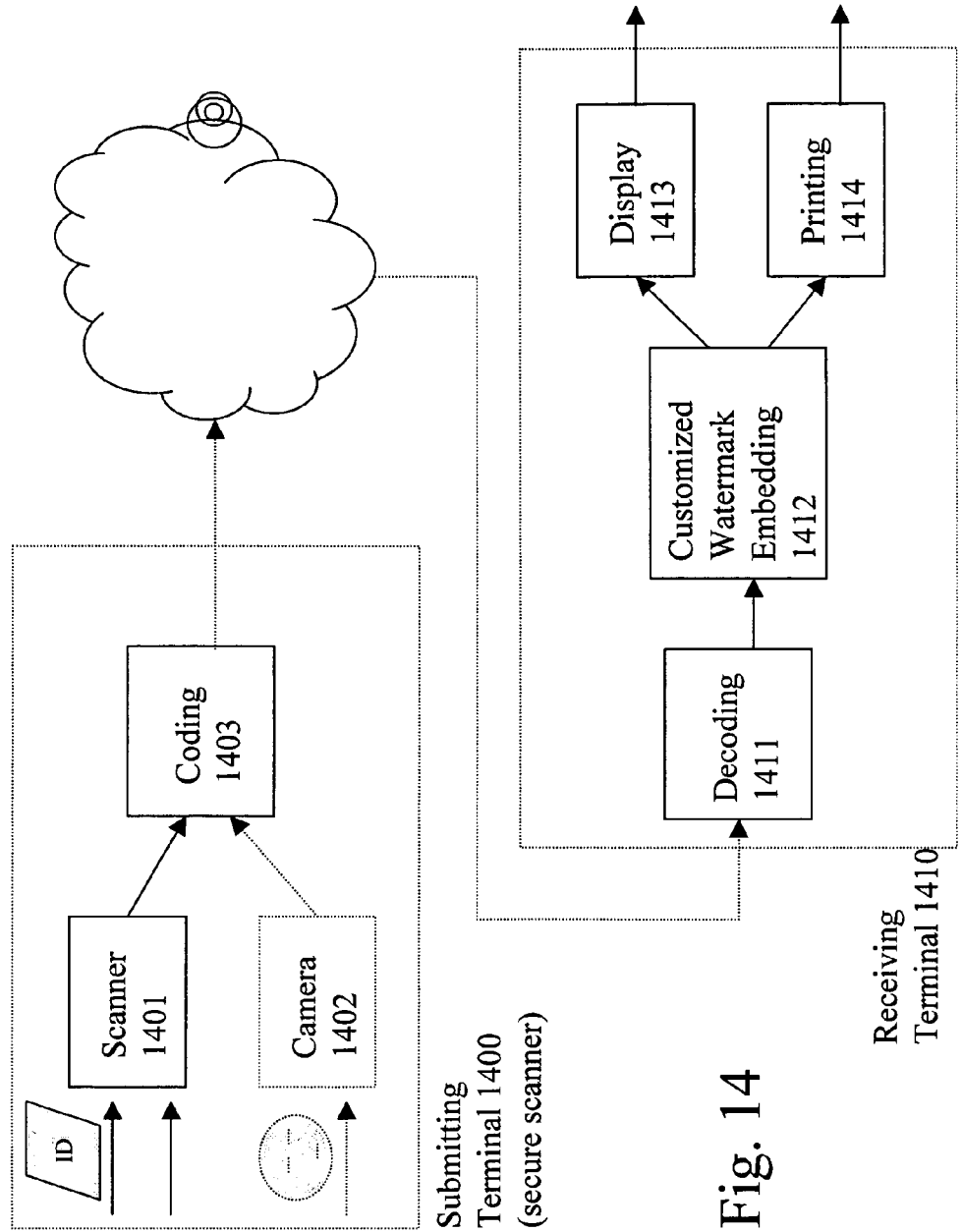
FIG. 14 illustrates a remote document submitting and receiving system according to an embodiment of the present invention.

The secure scanning and secure printing functions may be combined to provide a remote document submitting and receiving system shown in FIG. 14. The submitting terminal 1400 has a scanner 1401 that scans the document and a coding section 1403 that encrypts the scanned image an embeds it in a cover image. The submitting terminal 1400 optionally has a camera 1402 that captures a digital image that can be used as the cover image. The receiving terminal 1410 has a decoding section 1411 that extracts the embedded image and decrypts it to produce the original scanned image (document) that may be displayed by a display 1413 or printed by a printing section 1414. An optional customized watermark embedding section 1412 adds a watermark to the decrypted image before display or printing.

Figure 15:
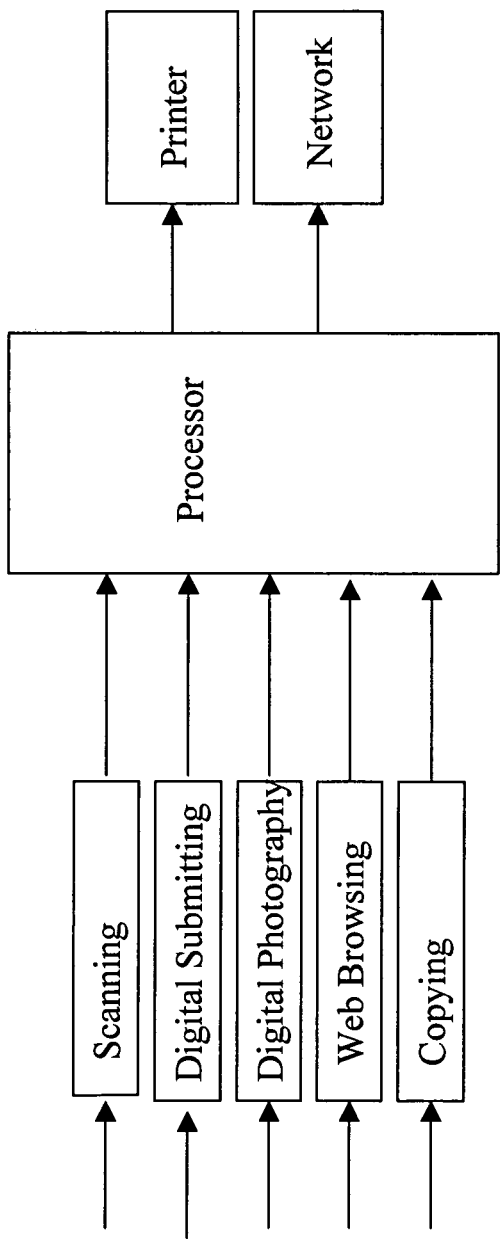
FIG. 15 illustrates a multi-function digital service terminal according to an embodiment of the present invention.

The submitting terminals of the remote document submitting and receiving system may be installed at businesses or other public places. The submitting terminals may also be a part of a multi-function digital service terminal, which may provide services such as digital document submitting, digital photography, scanning, printing, copying, Internet access, etc. as shown in FIG. 15.

The implementation of the above secure scanning device, secure printing device, secure ID scanning device, secure check reader, remote picture ID verification system, and remote document submitting and receiving system, although not described in extensive detail, is within the capabilities of those skilled in the relevant art based on the description given in this disclosure. It should be noted that these devices and systems may use the image encryption and embedding method described in this disclosure, or any other suitable image encryption and embedding method.

A digital signature feature may optionally be included to enhance the security of the above-described applications or other applications of an image encryption method. Digital signature is a known technique used in data transmission. For example, digital signature technique can be used to indicate whether the document is authentic or has been altered. A digital signature is a bit stream generated based on the content of the input document. In an embodiment shown in FIG. 16, a digital signature is generated from the secret image (step 1603) at the transmitting side 1600. The digital signature may be added to the secrete image (step 1604), such as by adding the digital signature to a fixed location or locations of the secret image. Alternatively, the digital signature may be transmitted to the receiving side separately (step 1607), such as by electronic mail. The secret image (with or without the added digital signature) is encrypted (step 1605) and embedded in the cover image (step 1606). As another alternative, the digital signature may be embedded in the cover image directly instead of being added to the secret image and encrypted as a part of the secret image. The cover image with the encrypted image embedded therein is transmitted via a network such as the Internet. At the receiving side 1610, the received image is extracted and decrypted (step 1611) to obtain the decrypted secret image. The digital signature is obtained depending on how it has been transmitted: it may be extracted from the decrypted image (step 1612); it may be directly extracted from the cover image; or it may be separately received from the transmitting side (step 1613) such as by electronic mail. The digital signature is then used to check the fidelity of the secret image (step 1614). This is done by comparing such digital signature with a digital signature re-generated from the decrypted image. This step will reveal whether the secret image has been altered.

Another variation of the encryption method described in this disclosure is to use the digital signature to generate the encryption key. A digital signature generated from the secret image may be encrypted using a suitable method such as ACE. A bit sequence (e.g., 64-bit or 128-bit) is then derived from the encrypted digital signature and used as the encryption key. An advantage of generating the encryption key from the digital signature is that the encryption key does not need to be separately inputted by the user.

It will be apparent to those skilled in the art that various modification and variations can be made in the image encryption an embedding method and apparatus of the present invention without departing from the spirit or scope of the invention. Thus, it is intended that the present invention cover modifications and variations that come within the scope of the appended claims and their equivalents.

What is claimed is:

1. A method implemented by a machine including hardware logic or a processor for encrypting an input image, the input image comprising a plurality of pixels, each pixel having a pixel value of a plurality of bits, the method comprising:
   receiving the input image;
   (a) dividing the input image into a plurality of pixel groups, each pixel group comprising one or more pixels of the input image;
   (b) shifting the location of the pixel groups according to an encryption key;
   (c) reordering the plurality of bits within each pixel value for at least some of the pixel values of the input image according to the encryption key, wherein for each resulting pixel value that has been reordered, each bit of the resulting pixel value uniquely corresponds to and has an identical bit value as a bit in the pixel value before the reordering irrespective of the bit values representing the pixel values before the reordering, and at least one of the bits of the resulting pixel value has a bit position different from a bit position of the corresponding bit before the reordering,
   whereby an encrypted image is generated; and
   storing or transmitting the encrypted image.

2. The method of claim 1, wherein step (b) comprises:
   (b1) generating from the encryption key a bit sequence having a number of bits;
   (b2) indexing the pixel groups according to the number of bits in the bit sequence;
   (b3) defining a shifting pattern based on a shifting rule and bit values of the bit sequence; and
   (b4) shifting the pixel groups according to the shifting pattern.

3. The method of claim 1, wherein step (c) comprises:
   (c1) generating from the encryption key a bit sequence having a number of bits;
   (c2) indexing the bits of the pixel values according to the number of bits in the bit sequence;
   (c3) defining a shifting pattern based on a shifting rule and bit values of the bit sequence; and
   (c4) shifting the bits of the pixel values according to the shifting pattern.

4. A method implemented by a machine including hardware logic or a processor for encrypting an input image, the input image comprising a plurality of pixels, each pixel having a pixel value of a plurality of bits, the method comprising:
   receiving the input image;
   (a) dividing the input image into a plurality of pixel groups, each pixel group comprising one or more pixels of the input image;
   (b) shifting the location of the pixel groups according to an encryption key;
   (c) reordering the plurality of bits within each pixel value for at least some of the pixel values of the input image according to the encryption key, wherein for each resulting pixel value that has been reordered, each bit of the resulting pixel value uniquely corresponds to and has an identical bit value as a bit in the pixel value before the reordering irrespective of the bit values representing the pixel values before the reordering, and at least one of the bits of the resulting pixel value has a bit position different from a bit position of the corresponding bit before the reordering, whereby an encrypted image is generated;
   (d) obtaining a cover image, the cover image having a plurality of pixels each having a pixel value of a plurality of bits;
   (e) embedding the encrypted image in the cover image by replacing less significant bits of the pixel values of the cover image with bits of the pixel values of the encrypted image; and
   storing the cover image with the encrypted image embedded therein or transmitting the cover image with the encrypted image embedded therein to a receiver.

5. The method of claim 4, further comprising embedding the encryption key in the cover image.

6. The method of claim 4, further comprising transmitting the encryption key to the receiver.

7. The method of claim 4, further comprising:
   generating a digital signature from the input image; and
   embedding the digital signature in the cover image.

8. The method of claim 4, further comprising:
   generating a digital signature from the input image; and
   transmitting the digital signature to the receiver.

9. A method implemented by a machine including hardware logic or a processor for decrypting an encrypted image, the encrypted image comprising a plurality of pixels, each pixel having a pixel value of a plurality of bits, the method comprising:
   receiving the encrypted image;
   (a) dividing the encrypted image into a plurality of pixel groups, each pixel group comprising one or more pixels of the encrypted image;
   (b) reverse-shifting the location of the pixel groups according to an encryption key;

(c) reverse-reordering the plurality of bits within each pixel value for at least some of the pixel values of the encrypted image according to the encryption key, wherein for each resulting pixel value that has been reverse-reordered, each bit of the resulting pixel value uniquely corresponds to and has an identical bit value as a bit in the pixel value before the reverse-reordering irrespective of the bit values representing the pixel values before the reverse-reordering, and at least one of the bits of the resulting pixel value has a bit position different from a bit position of the corresponding bit before the reverse-reordering, whereby a decrypted image is generated; and storing or transmitting the decrypted image.

10. The method of claim 9, wherein the encrypted image has been embedded in a cover image, wherein the receiving step comprises:

receiving the cover image in which the encrypted image has been embedded; and extracting the encrypted image from the cover image.

11. A non-transitory computer usable medium having a computer readable code embodied therein for encrypting an input image, the input image comprising a plurality of pixels, each pixel having a pixel value of a plurality of bits, the computer program product comprising:

first computer readable program code for dividing the input image into a plurality of pixel groups, each pixel group comprising one or more pixels of the input image;

second computer readable program code for shifting the location of the pixel groups according to an encryption key; and third computer readable program code for reordering the plurality of bits within each pixel value for at least some of the pixel values of the input image according to the encryption key, wherein for each resulting pixel value that has been reordered, each bit of the resulting pixel value uniquely corresponds to and has an identical bit value as a bit in the pixel value before the reordering irrespective of the bit values representing the pixel values before the reordering, and at least one of the bits of the resulting pixel value has a bit position different from a bit position of the corresponding bit before the reordering.

12. The non-transitory computer usable medium of claim 11, wherein the second computer readable program code comprises:

computer readable program code for generating from the encryption key a bit sequence having a number of bits;

computer readable program code for indexing the pixel groups according to the number of bits in the bit sequence;

computer readable program code for defining a shifting pattern based on a shifting rule and bit values of the bit sequence; and computer readable program code for shifting the pixel groups according to the shifting pattern.

13. The non-transitory computer usable medium of claim 11, wherein the third computer readable program code comprises:

computer readable program code for generating from the encryption key a bit sequence having a number of bits;

computer readable program code for indexing the bits of pixel values according to the number of bits in the bit sequence;

computer readable program code for defining a shifting pattern based on a shifting rule and bit values of the bit sequence; and computer readable program code for shifting the bits of the pixel values according to the shifting pattern.

14. The non-transitory computer usable medium of claim 11, further comprising:

fourth computer readable program code for obtaining a cover image, the cover image having a plurality of pixels each having a pixel value of a plurality of bits; and fifth computer readable program code for embedding the encrypted image in the cover image by replacing less significant bits of the pixel values of the cover image with bits of the pixel values of the encrypted image.

15. A non-transitory computer usable medium having a computer readable code embodied therein for decrypting an encrypted image, the encrypted image comprising a plurality of pixels, each pixel having a pixel value of a plurality of bits, the computer program product comprising:

first computer readable program code for dividing the encrypted image into a plurality of pixel groups, each pixel group comprising one or more pixels of the encrypted image;

second computer readable program code for reverse-shifting the location of the pixel groups according to an encryption key; and third computer readable program code for reverse-reordering the plurality of bits within each pixel value for at least some of the pixel values of the encrypted image according to the encryption key, wherein for each resulting pixel value that has been reverse-reordered, each bit of the resulting pixel value uniquely corresponds to and has an identical bit value as a bit in the pixel value before the reverse-reordering irrespective of the bit values representing the pixel values before the reverse-reordering, and at least one of the bits of the resulting pixel value has a bit position different from a bit position of the corresponding bit before the reverse-reordering.

16. The non-transitory computer usable medium of claim 15, wherein the encrypted image has been embedded in a cover image, the computer program product further comprising:

third computer readable program code for extracting the encrypted image from the cover image.

* * * * *